United States Patent
Gils et al.

(10) Patent No.: US 12,555,399 B2
(45) Date of Patent: Feb. 17, 2026

(54) SYSTEMS AND METHODS FOR IDENTITY DOCUMENT FRAUD DETECTION

(71) Applicant: Stripe, Inc., South San Francisco, CA (US)

(72) Inventors: Charlotte Gils, Mont-Saint-Hilaire (CA); Efstathios Vafeias, London (GB)

(73) Assignee: Stripe, Inc., South San Francisco, CA (US)

( * ) Notice: Subject to any disclaimer, the term of this patent is extended or adjusted under 35 U.S.C. 154(b) by 362 days.

(21) Appl. No.: 18/070,983

(22) Filed: Nov. 29, 2022

(65) Prior Publication Data

US 2024/0177512 A1    May 30, 2024

(51) Int. Cl.
| | |
|---|---|
| *G06V 30/19* | (2022.01) |
| *G06F 40/169* | (2020.01) |
| *G06Q 20/40* | (2012.01) |
| *G06V 10/774* | (2022.01) |
| *G06V 10/82* | (2022.01) |
| *G06V 20/00* | (2022.01) |
| *G06V 30/41* | (2022.01) |

(52) U.S. Cl.
CPC ........ *G06V 30/1916* (2022.01); *G06F 40/169* (2020.01); *G06Q 20/4016* (2013.01); *G06V 10/774* (2022.01); *G06V 10/82* (2022.01); *G06V 20/95* (2022.01); *G06V 30/19013* (2022.01); *G06V 30/19147* (2022.01); *G06V 30/41* (2022.01)

(58) Field of Classification Search
CPC ............... G06N 20/00; G06Q 30/0185; G06Q 30/0609; G06V 30/413
See application file for complete search history.

(56) References Cited

U.S. PATENT DOCUMENTS

| | | |
|---|---|---|
| 10,685,347 B1 | 6/2020 | Edwards et al. |
| 10,949,852 B1 | 3/2021 | Kramme et al. |

(Continued)

OTHER PUBLICATIONS

Notice of Allowance received for U.S. Appl. No. 18/071,381, mailed on Feb. 7, 2024, 15 pages.

(Continued)

*Primary Examiner* — Akwasi M Sarpong
*Assistant Examiner* — Michael L Burleson
(74) *Attorney, Agent, or Firm* — Finnegan, Henderson, Farabow, Garrett & Dunner, LLP

(57) ABSTRACT

A method and apparatus for fraud detection during transactions using identity graphs are described. The method may include receiving a document image for detecting whether an identity document depicted within the document image is fraudulent. The method may also include extracting data associated with the document image to generate extracted data comprising image data extracted from the document image, image file data extracted from an image file for the document image, or a combination thereof. The method may also include processing, by a set of machine learning models, corresponding subsets of the decoded image data used as input to each machine learning model of the set of machine learning models, and further by a second machine learning model that generates a final score indicative of whether the document image depicts a fraudulent identity document, at least one or more initial scores.

19 Claims, 8 Drawing Sheets

(56) References Cited

U.S. PATENT DOCUMENTS

| | | | |
|---|---|---|---|
| 10,990,896 B2 | 4/2021 | Jenson | |
| 11,568,400 B2 | 1/2023 | Sundararaman et al. | |
| 2014/0344902 A1* | 11/2014 | Clark | H04L 9/32 |
| | | | 726/4 |
| 2015/0161610 A1* | 6/2015 | Sahadevan | G06Q 20/4016 |
| | | | 705/44 |
| 2019/0266474 A1 | 8/2019 | Stark et al. | |
| 2020/0104992 A1 | 4/2020 | Schumacher et al. | |
| 2020/0110932 A1 | 4/2020 | Berger et al. | |
| 2021/0019519 A1* | 1/2021 | Martin | G06F 18/217 |
| 2021/0124919 A1 | 4/2021 | Balakrishnan et al. | |
| 2021/0158036 A1 | 5/2021 | Huber, Jr. | |
| 2021/0390629 A1 | 12/2021 | Bildner et al. | |
| 2022/0277310 A1 | 9/2022 | Adjaoute | |
| 2022/0309275 A1 | 9/2022 | Kirsten et al. | |
| 2022/0329328 A1* | 10/2022 | Paulraj | H04B 17/11 |
| 2023/0132720 A1* | 5/2023 | Khmaissia | G06N 3/088 |
| | | | 382/181 |
| 2023/0385831 A1 | 11/2023 | Fyfe et al. | |
| 2023/0418948 A1* | 12/2023 | Karpovsky | G06F 21/554 |

OTHER PUBLICATIONS

Ahn, Junyoung, Object Detection: Backbone, Neck and Head Architecture [online], velog.io, Available Online at <URL: https://velog.io/@hewas1230/ObjectDetection-Architecture>, Mar. 14, 2021, 6 pages.

International Search Report and Written Opinion received for PCT Patent Application No. PCT/US23/81703, mailed on Apr. 1, 2024, 15 pages.

International Preliminary Report on Patentability received for PCT App. No. PCT/US2023/081703, mailed on Jun. 12, 2025, 9 pages.

Non-Final Office Action received for U.S. Appl. No. 18/647,158, mailed on Jul. 17, 2025, 7 pages.

* cited by examiner

SYSTEMS AND METHODS FOR IDENTITY DOCUMENT FRAUD DETECTION

CROSS-REFERENCE TO RELATED APPLICATIONS

The present application is related to U.S. patent application Ser. No. 18/071,381, filed Nov. 29, 2022, and titled "SYSTEMS AND METHODS FOR IDENTITY DOCUMENT FRAUD DETECTION," which is incorporated herein by reference in its entirety.

BACKGROUND

Merchants, such as grocers, car services, dry cleaning services, online marketplaces, etc., provide their products and services to consumers. Such merchants may employ agents to deliver their products and/or provide the actual services to the merchant's customers. For example, a person acting on the merchant's behalf will drive a consumer in their own car, deliver food ordered through a merchant website, pick up and/or drop off clothes dry cleaned by the merchant, etc.

These merchants, although providing systems for supplying products and/or services to consumers, often do not perform the financial processing associated with the merchant transactions. Instead, merchants utilize commerce systems to process financial transactions for the products and/or services provided to consumers. This may include the merchant, agent, and other users establishing accounts with the commerce system. Once the accounts are established, merchants can run financial transactions using the services of the commerce system, merchant agents can accept payments from customers on behalf of the merchant for provided products and/or services, and the commerce system can process the payments, performs payouts for services rendered, as well as other financial processing services. This processing of payments by the commerce platform may include running credit cards, crediting a merchant account for the transaction, crediting the agent responsible for the transaction, debiting a commerce system fee for processing the transaction on behalf of the merchant, interacting with authorization network systems (e.g., bank systems, credit card issuing systems, etc.), as well as performing other commerce related transactions for the merchant and/or agent such as providing payouts for products/services rendered on behalf of a merchant.

To prevent fraudulent transactions, such as establishing a false merchant account for nefarious purposes, running fraudulent transactions, onboarding a fraudulent agent to a merchant, etc., the commerce system may seek to verify merchant/agent supplied information, collect information to verify supplied information, and otherwise verify that a user claiming to be a merchant and/or agent is who they say they are. One such way of verifying an identity of a user is to collect and verify an identity document, such as a government issued identification document (e.g., passport, driver's license, social security card, or other document from which a user identity can be verified). However, the modern computing environment has created a technical challenge to verification of such identity documents.

More specifically, systems, such as a commerce platform system, merchant system, and/or agent system are typically remote and communicate over a communications network by exchanging information via electronic messages. Thus, the identity document supplied to the commerce platform is typically an image of the identity document, and not the document itself. Furthermore, with modern image editing technologies, fraudulent document image templates as well as legitimate identity document images are simple to modify to create seemingly convincing but fraudulent identity documents. As a result, the technical challenge of how to accurately and consistently verify an image of an identity document as depicting an authentic identity document (e.g., a document free from alternation and being that which it purports to be), and how to detect fraudulent identity document images, urgently is to be addressed. This technical challenge is becoming increasingly important as not just commerce platforms rely on remote document image verification, but many other systems and applications including standalone identity verification systems rely on fraudulent document image detection.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

Figure 1:
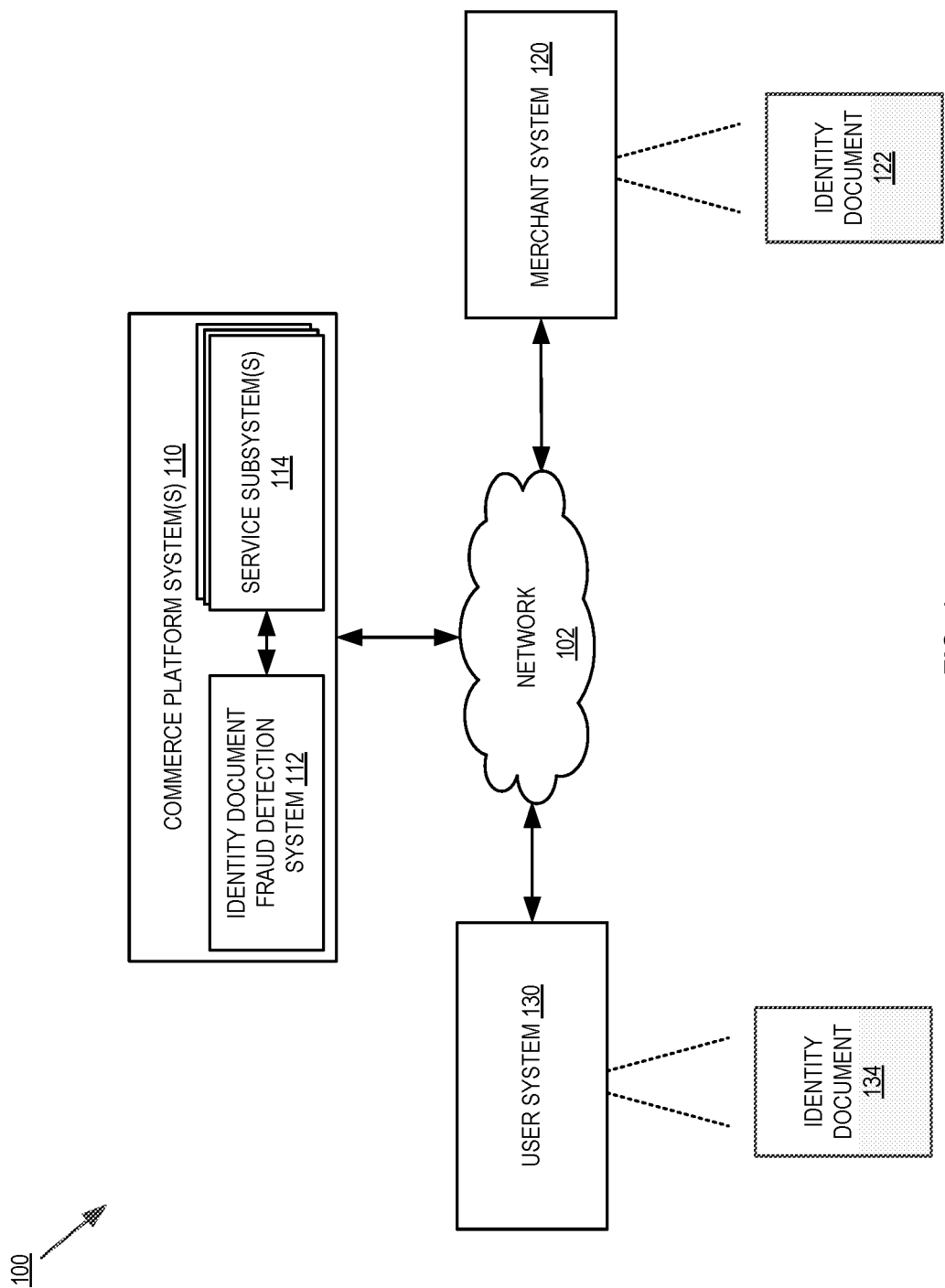
FIG. 1 is a block diagram of an exemplary system architecture for identity document fraud detection.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "decoding", "processing", "determining", "inputting", "generating", "providing", "extracing", "storing", "updating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of an exemplary system architecture 100 for identity document fraud detection. In one embodiment, the system 100 includes commerce platform system(s) 110, a merchant system 120, and a user system 130. In one embodiment, one or more systems (e.g., system 120 and 130) may be mobile computing devices, such as a smartphone, tablet computer, smartwatch, etc., as well computer systems, such as a desktop computer system, laptop computer system, server computer systems, etc. The commerce platform system(s) 110 and merchant system(s) 120 may also be one or more computing devices, such as one or more server computer systems, desktop computer systems, etc. Furthermore, there may be any number of merchant and/or user systems utilizing the services of the commerce platform system(s) 110. However, to avoid obscuring the present description, only one user system and merchant system are illustrated.

Furthermore, it should be appreciated that the embodiments discussed herein may be utilized by a plurality of different types of systems, such as other commerce platform system(s) including payment processing systems, card authorization systems, banks, and other systems seeking to identify and detect fraud during transactions. Furthermore, any system seeking to identify fraudulent identity documents for verification of identity may use and/or extend the techniques discussed herein to identity document based fraud detection. However, to avoid obscuring the embodiments discussed herein, identity document fraud detection to verify authenticity of an identity document for a commerce platform service subsystem 114 requiring such verification to provide its associated services, is discussed to illustrate and describe the embodiments of the present invention, and is not intended to limit the application of the techniques described herein to other systems in which identity document image fraud detection could be used.

The commerce platform system(s) 110, merchant system 120, and user system 130 may be coupled to a network 102 and communicate with one another using any of the standard protocols for the exchange of information, including secure communication protocols. In one embodiment, one or more of the commerce platform system(s) 110, merchant system 120, and user system 130 may run on one Local Area Network (LAN) and may be incorporated into the same physical or logical system, or different physical or logical systems. Alternatively, the commerce platform system(s) 110, merchant system 120, and user system 130 may reside on different LANs, wide area networks, cellular telephone networks, etc. that may be coupled together via the Internet but separated by firewalls, routers, and/or other network devices. In one embodiment, commerce platform system 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, commerce platform system 110 provides financial processing services to one or more merchants, such as to merchant system 120 and/or user system 130 that acts as an agent of merchant system 120. For example, commerce platform system(s) 110 may manage merchant accounts held at the commerce platform, run financial transactions from user system(s) 130 performed on behalf of a merchant, clear transactions, performing payouts to merchant and/or merchant agents, manage merchant and/or agent accounts held at the commerce platform system(s) 110, as well as other services typically associated with commerce platforms systems such as, for example, STRIPE™.

In embodiments, the various services provided to the merchant system 120 and/or the user system 130 are performed by service subsystem(s) 114. Each service subsystem may be a server computer, instance of a server computer, process, etc. that manages a service provided to merchant system 120 and/or user system 130. For example, there may be an onboarding service subsystem that is responsible for managing the merchant account onboarding of new merchant systems. As another example, there may be an agent account onboarding service subsystem that is responsible for onboarding a merchant's agent that can transact on the merchant's behalf. As yet another example, there may be additional service subsystems, such as subsystems that enable adding new users to an existing merchant/agent account, enable account change, enable financial transactions to be run on behalf of a merchant, etc. To prevent fraud being perpetrated on the commerce platform system(s) 110, in embodiments, one or more the service subsystem(s) 114 seeks to authenticate a user of the merchant system 120 or user system 130 prior to activating a requested service (e.g., establishment of a merchant account, establishment of an agent account, changing a property of an established account, etc.). One form of authentication used by commerce platform system(s) 113 is verification of an identity document.

In embodiments, a service subsystem 114 requests an image of an identity document, such as an image of a driver's license, passport, social security card, or other acceptable form of identity document, from one of the merchant system 120 or user system 130. The merchant system 120 or user system 130 then captures an image of an associated identity document 122 or 134. For example, the identity document may be imaged using a camera, scanner, or other imaging device associated with the merchant system 120 or user system 130. Alternatively, the merchant system 120 or user system 130 may also supply a previously captured image of the requested identity document. This image purporting to depict the authentic and valid identity document is transmitted to the service subsystem 114.

In embodiments, service subsystem 114 utilizes identity document fraud detection system 112 to determine if the identity document image is fraudulent by authenticating the identity document image and document depicted therein. As will be discussed in greater detail below, the identity document fraud detection system 112 receives the identity document image and performs one or more decoding operations on the document image to extract document image data from the image file. For example, the decoding operations can include optical character recognition (OCR) (e.g., to extract information such as first name, last name, address, date of birth, etc. from the document image), machine readable zone/barcode decoding (e.g., to extract machine readable data embedded in the document image), image file data extraction (e.g., to extract pixel data from the document image file), as well as accessing and/or obtaining additional data as will be discussed herein. Then, in one embodiment, different subsets are each provided as input to each of an ensemble of machine learning models trained to detect different types of document image fraud. For example, in the ensemble of machine learning models, a document imaging fraud model may be trained to detect using pixel data (e.g., to detect if a document depicted within the image has used the incorrect type of paper, is too reflective, is too flat, or other factors indicative of fraudulent image data), an email address fraud detection model that is trained to determine if data extracted from a document image is likely to match a supplied email address, an identity graph feature extractor that generates one or more features (e.g., based on a transaction history or past fraudulent activities, such as for example, features based on total numbers of past declines, past transaction totals, past accepted transactions, past fraud determinations, etc. accessible via commerce platform system(s) 110), a fraudulent MRZ/barcode detection model that determines if data encoded in an MRZ or barcode is likely to be fraudulent, and a fraud model that is trained to take the aforementioned model outputs as inputs to then make a final prediction of a fraudulent identity document. In another embodiment, a single machine learning model, have each of the above mentioned models as backbones within the single model may be used to similarly determine whether a document image is likely to be fraudulent. Then, based on a score output by the embodiments above, a threshold can be applied to determine if the score satisfies a fraud detection condition, and the determination provided to the service subsystem.

The service subsystem 114 communicates the fraud determination results to the merchant system 120 and/or user system 130, such as an indication that the supplied identity document depicted in the image is valid, in which case the service subsystem 114 may proceed with managing the service provided to the merchant system 120 and/or use system 130.

When identity document fraud detection system 112 determines that the document image depicts a fraudulent document image (e.g., it has been altered, displays false information, the information is determined to likely be fraudulent, is generated from a fraudulent template, etc.), service subsystem 114 may return the decision to reject the identity document, with an invitation to perform one or more corrective actions. In embodiments, the corrective actions may include a request to supply a different identity document image (which is itself subject to verification), or provide feedback data that refutes the fraudulent document determination. When such feedback data is received, and does refute the original determination (e.g., is verified by the fraud detection system and/or a human operator), identity document fraud detection system 112 may store the feedback information with the originally extracted document image data and/or the document image as machine learning model training data, and to supplement manually annotated identity document training data (e.g., images depicting identity documents with annotations indicating presence or lack of fraud). Thus, the machine learning model(s) of identity document fraud detection system 112 may be periodically retrained with supplemented training data to further improve the accuracy of their fraud detection capabilities.

As discussed above, and as will be discussed in greater detail below, the identity document fraud detection system 112 enables a fraud determination to be made on a document image that verifies the authenticity of the document depicted within the image. Furthermore, because either an ensemble of machine learning models or a single machine learning model with several backbones is deployed by identity document fraud detection system 112, significant improvements in fraudulent document detection is achieved by detecting and/or using different types of fraud detection within the ultimate fraud determination. Thus, commerce platform system(s) 110 is able to use identity document fraud detection system 112 to solve the urgent technical challenge of how to determine if a document image supplied by a remote system depicts a fraudulent or authentic identity document. Beneficially, by using an improved fraud determination, the service subsystem(s) 114 may more confidently provide their respective services the requesting merchant system 120 and/or user system 130. Additionally, by allowing a dispute process in which a user may provide feedback data challenging a fraud determination, a feedback loop is created that enables retraining of the machine learning model(s) of the identity document fraud detection system 112 to not only improve the models themselves, but also the resulting identity document image fraud detection process.

Figure 2:
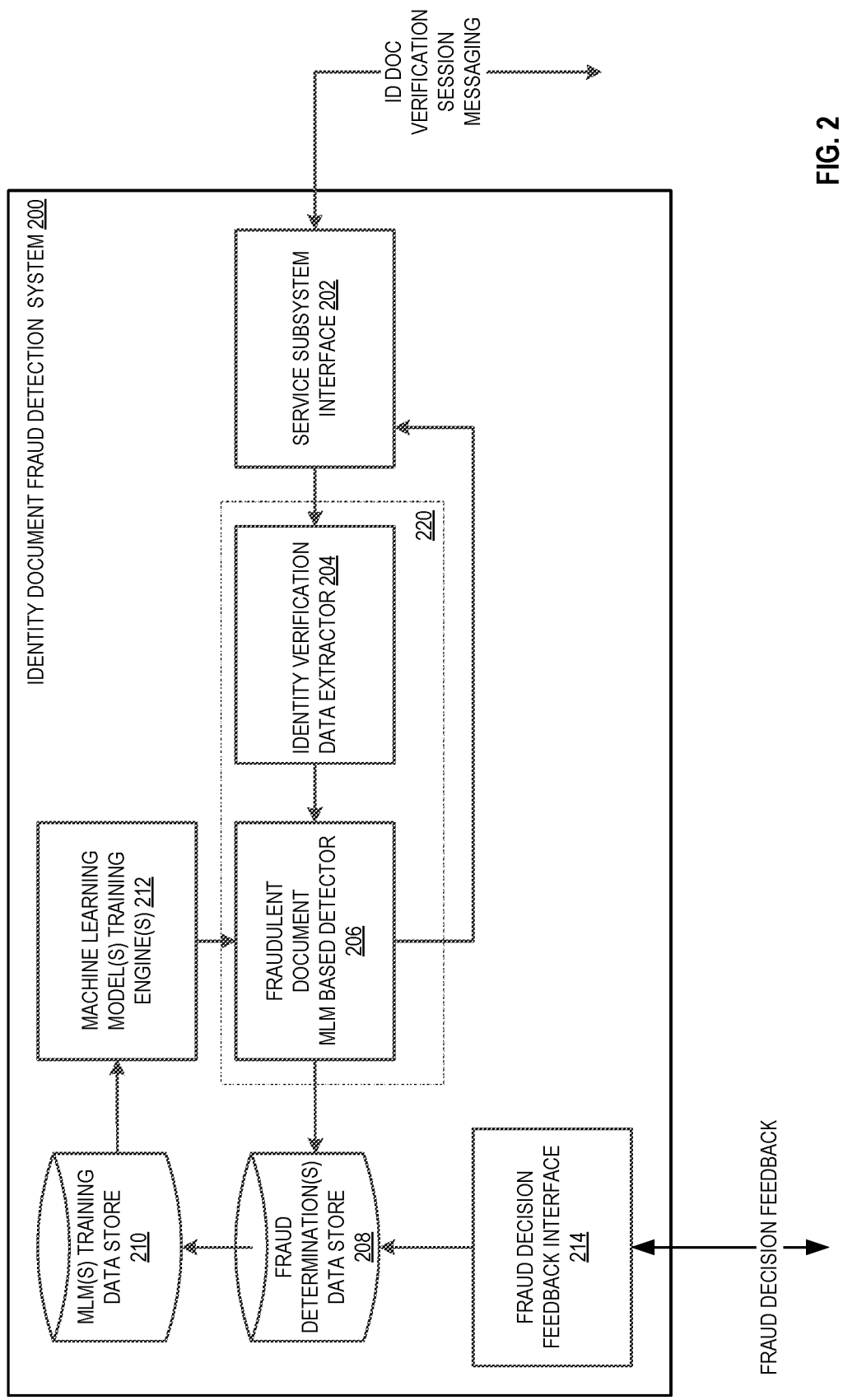
FIG. 2 is a block diagram of one embodiment of an identity document fraud detection system of a commerce platform system.

FIG. 2 is a block diagram of one embodiment of an identity document fraud detection system 200 of a commerce platform system. In embodiments, the identity document fraud detection system 200 performs fraud detection of identity documents depicted in document images for service subsystem(s) 114 of commerce platform system(s) 110. The identity document fraud detection system 200 provides additional details for the identity document fraud detection system 112 discussed above in FIG. 1.

In one embodiment, identity document fraud detection system 200 includes a subsystem service interface 202, a identity verification data extractor 204, a fraudulent document image machine learning model (MLM) based detector 206, MLM training engine(s) 212, a fraud decision feedback interface 214, and one or more data stores (e.g., fraud determination(S) data store 208 and MLM training data store 210, which in embodiments may be the same data store).

Subsystem service interface 202 establishes an identity document verification session with a service subsystem, such as through the exchange of one or more application programming interface (API) based messages. The session messaging may include establishing a session identifier, exchanging security keys, receiving a document image that is purported to depict a valid identity document, receiving additional metadata (e.g., data supplied from a user/merchant to the service subsystem such as names, addresses, governmental identifiers, dates, phone number(s), email addresses, one or more IP addresses, camera related data, etc.). The document image received through the session messaging, along with the additional metadata, is passed from subsystem service interface 202 to identity verification data extractor 204.

Identity verification data extractor 204 is responsible for extracting and decoding data from the received document image, session information, etc. For example, identity verification data extractor 204 may include a plurality of different decoders that decode and extract different forms of information from the document image. In embodiments, the decoders of identity verification data extractor 204 can include an optical character recognition (OCR) decoder that analyze the document image to segment, identify, and then extract relevant information from the document image. Such information obtained from the OCR decoder can include a first name, middle name, last name, address, email address, telephone number(s), document identifier(s) (e.g., social security number, driver's license number, passport number, etc.), type of document, state/country/municipality associated with the document, as well as any other textual information depicted in a document image and which serves as input to one or more machine learning model(s) as discussed below.

In embodiments, the decoders of identity verification data extractor 204 may further include an MRZ/barcode decoder. In embodiment, the MRZ/barcode decoder is capable of detecting an MRZ/barcode within the document image and decoding the content encoded by the MRZ/barcode. This can include a value of the MRZ/barcode and other data encoded within the MRZ/barcode. The decoded MRZ/barcode data also serves as input to one or more machine learning model(s) as discussed below.

In embodiments, the decoders of identity verification data extractor 204 may further include an image file decoder. The image file decoder is responsible for extracting metadata from the image file, such as type of camera, lenses, device identifier, metadata attached to the image file, image format type, etc. Furthermore, the image file decoder may extract a set of pixels from the image file, pixel values, or other pixel related image data. The image file metadata and pixel data further serve as input to one or more machine learning model(s) as discussed below.

In embodiments, the decoders of identity verification data extractor 204 further include an identity graph decoder responsible for using received and/or extracted metadata (e.g., user names, phone numbers, email addresses, etc.) to obtain identity graph features. As discussed in U.S. patent application Ser. No. 16/915,477, entitled "SYSTEMS AND METHODS FOR IDENTITY GRAPH BASED FRAUD DETECTION", which is incorporated herein, user data may be collected over a series of transactions performed by a commerce platform system 110. An identity graph is then formed that links a user's identity to their history on the commerce platform system, such as a graph providing data indicative of credit card transactions, legitimate or fraudulent merchant accounts, etc. These links are established for various inputs to the identity fraud detection system 200 (e.g., various attributes such as name, date of birth, address, email, phone, etc.), resulting in feature vectors which also serve as input to one or more machine learning model(s) as discussed below.

As discussed above, each decoder is responsible for decoding, extracting, obtaining, and collecting different types and/or different sets of data associated with the received identity document. These data sets are then supplied to the fraudulent document MLM based detector 206. In embodiments, one or more elements of session information received by interface 202 may also be provided to identity verification data extractor 204, which forwards the session information to the fraudulent document MLM based detector 206 with the decoded and/or extracted data. The fraudulent document MLM based detector 206 includes one or more machine learning models that take as input one or more sets of data from the decoders and/or session information. Furthermore, each of the one or more machine learning models is trained by MLM training engine(s) 212 prior to receipt of the data based on annotated training data (e.g., sets of data generated by the decoders, session data, or a combination thereof, which is annotated with a fraud determination). The annotated training data is stored in MLM training data store 210, so that incremental (and periodic as discussed below) training of the MLMs of the fraudulent document MLM based detector 206.

In embodiments, each of the one or more MLM(s) analyzes the respective inputs to generate respective fraud determination scores associated with the type of data input to the machine learning model, wherein the data can be image data, text data extracted from image data, data from a verification session (e.g., an IP address, geolocation associated with the IP address, etc.), other types of data discussed herein, as well as a combination of different types of data. Each MLM is therefore responsible for generating a fraud score, which can be fed into a final fraud detection MLM (e.g., which takes the respective scores as inputs, and is trained using the annotated training data noted above). The fraud score may then be compared to a fraud detection threshold, such as when the fraud score has a value that satisfies the threshold, the identity document depicted in the document image is determined to be fraudulent; and when the fraud score has a value that does not satisfy the threshold, the identity document depicted in the document image is determined to be valid. The fraud determination and associated data is stored in fraud determinations data store 208.

The fraudulent document MLM based detector 206 provides the fraud determination results for the identity document depicted within the document image to the subsystem service interface 202. Subsystem service interface 202 utilizes session messaging to provide the fraud determination results to the associated service subsystem, which in turn provides the result to the associated merchant system and/or user system.

In some embodiments, when a document image is determined to depict a fraudulent identity document, the fraud determination communicated to the merchant system and/or user system may further include a link to dispute the determination. Optionally, other forms of document image review may be used, such as manual review by a user associated with the commerce platform system. Then, if a determination is disputed, fraud decision feedback interface receives fraud decision feedback data, such as evidence supporting authenticity of the identity document, a new image of the identity document, a human intervention, etc. When the feedback data is persuasive, it can be used to both update the fraud decision stored in data store 208, and annotate the decision and associated MLM input data in training data store 210. Thus, the feedback process enables feedback on edge cases where predicted fraud may not be accurate, but which additional feedback and retraining can eliminate incorrect fraud determinations. This helps to improve the MLMs of the fraudulent document MLM based detector 206 by providing for more accurate and consistent fraud detection as more feedback is received.

Figure 3:
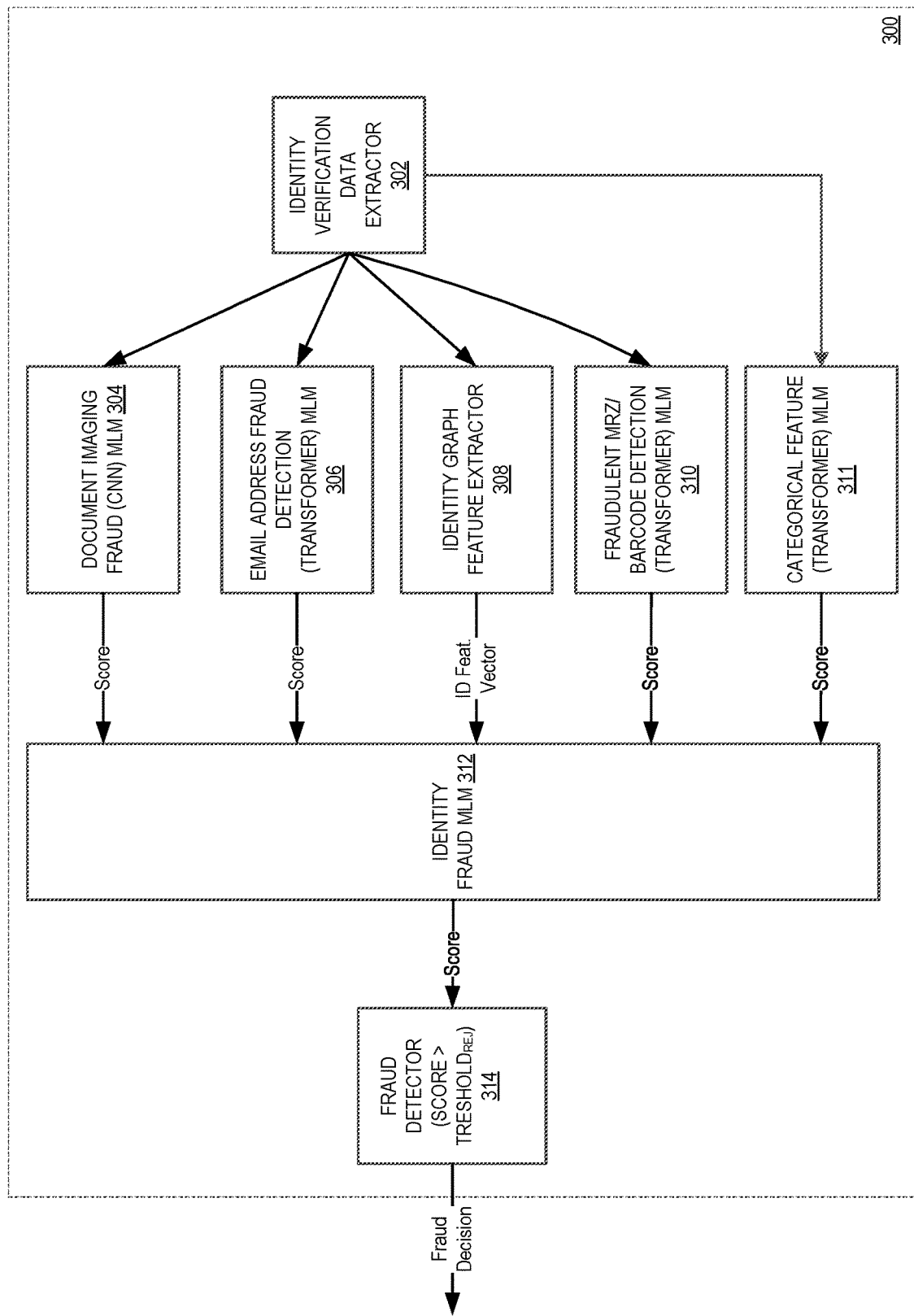
FIG. 3 is a block diagram of one embodiment of an ensemble of machine learning models for identity document fraud detection.

FIG. 3 is a block diagram of one embodiment 300 of an ensemble of machine learning models for identity document fraud detection. The ensemble may be used in conjunction with a set of decoders and information extractors (e.g., identity verification data extractor 204), and provides additional details for the systems illustrated within block 220 of FIG. 2.

As discussed above, identity verification data extractor 302 includes the multiple decoders, as discussed above.

The identity verification data extractor 302 includes an OCR decoder that extracts textual information depicted within the identity document depicted within the image, such as names, address, country data, document type, document numbers, etc. The identity verification data extractor 302 also includes an image decoder that extracts image pixel data values for a set of pixels of the document image depicting the identity document. The pixel data may include various values such as color values, brightness values, an n-bit pixel value, etc. The subset may be a sampled set of pixels (e.g., a predetermined N pixels at predetermined image locations), or may include all image pixel data. The identity verification data extractor 302 also includes an MRZ/barcode decoder that decodes data located in a machine readable zone, QR code, barcode, etc. depicted on an identity document. For example, a barcode may encode integrity information, information associated with the identity of the document holder, etc. The decoders, therefore, generate one or more sets of verification metadata including metadata extracted from OCR results, extracted from image data, received as input from a user seeking the document image verification, or decoded from the MRZ/barcode depicted in an identity document.

In embodiments, the pixel data from the identity verification data extractor 302 is then fed as input to the document imaging fraud machine learning model 304. The document imaging fraud machine learning model 304, in embodiments, is a neural network based machine learning model, such as a convolutional neural network. The document imaging fraud machine learning model 304, in embodiments, may be trained (by MLM training engines 212) on training data of past verifications (fraudulent and not fraudulent). The MLM training engines 212 therefore learn via the training process how image pixels relate to fraud status, which includes relationships to aspects such as common fraud templates, photo and font manipulations, ID safety features such as holograms, three-dimensional nature of the ID (or absence of), screenshots, etc.$ The trained document imaging fraud machine learning model 304, which takes as input the set of pixel data of the document image and a subset of metadata, generates an intermediate fraud score that is indicative of whether the image data is indicative of a fraudulent identity document.

The identity verification data extractor 302 further feeds a combination of a subset of verification metadata and session information into an email address fraud detection machine learning model 306. The verification metadata can include the metadata extracted from OCR results, or received as session information captured and/or input for a user seeking the document image verification. For example, the combination of verification metadata can include a received email address, an IP address, a user name, etc. In embodiments, verification metadata including at least a first name and last name (e.g., extracted through the OCR discussed herein) and an email address (e.g., provided by a user) is fed into the email address fraud detection machine learning model 306, which in embodiments is a transformer based MLM having self-attention (e.g., a recurrent neural network, BERT, GPT, etc.). The transformer architecture of the email address fraud detection machine learning model 306 identifies suspicious email addresses based on the characters in the email and name. The model learns aspects, such as autogenerated or throwaway email addresses, suspicious domains, as well as lack of correlation between name and email address (e.g., extracted name of Jane Doe does not correlate with john@fraudster.ru).

In embodiments, a combination of another subset of verification metadata and session information is fed into the identity graph feature extractor 308. The combination of metadata comprises a set of data sufficient to uniquely identify a particular user, such as a combination of first name, last name, address, date of birth, IP address, date of birth, or other combination of extracted and/or received data. As discussed above, this information is matched against a database of identity graphs generated for real and fraudulent identities. The identities in this database are established on the basis of their history of directly and indirectly using products and/or services of the commerce platform system. One or more features, and associated values of the features, from the identity graph are then output as features of a feature vector. $ The data decoded from the MRZ/barcode depicted in the identity document image is then fed into the fraudulent MRZ/barcode detection MLM 310. The fraudulent MRZ/barcode detection MLM 310 is also a transformer based model, which is trained (by training engines 212) to detect an incorrectly formatted MRZ/barcode based on unexpected characters, an unexpected order of characters, etc. A fraud score for the MRZ/barcode depicted in the identity document image is then output from fraudulent MRZ/barcode detection MLM 310.

In embodiments, the ensemble of machine learning models further includes a categorical feature MLM 311. In embodiments, this MLM is a transformer based MLM, which takes as input a set of features obtained through verification session messaging, forwarded from identity verification data extractor 302, as discussed above in FIG. 2. In embodiments, the set of features can include a country, an geographic location associated with an IP address, a camera label, a phone type, a device, an operating system, a browser type and/or version, a merchant type (e.g., a merchant being onboarded, an existing merchant, etc.), an ID type submitted for verification, etc. Furthermore, the categorical feature MLM 311 is trained by MLM training engine 212 to generate a score indicative of predicted fraud from past detected fraud and non-fraudulent feature sets. This score, generated by the categorical feature MLM 311 is also passed to identity fraud MLM 312.

In embodiments, a final MLM of the ensemble of machine learning models includes the identity fraud MLM 312. The identity fraud MLM is trained by MLM training engine 212 at least in part, using annotated data having the outputs of the prior MLMs (e.g., 304-310) as the inputs to the identity fraud MLM 312, and being associated with verified fraudulent document images and authentic document images. In embodiments, the identity fraud MLM 312 is, for example, a tree based model (e.g., XG Boost) that can use the totality of the scores and their interactions in making a final identity document image fraud score. The final score is passed to fraud detector 314.

Fraud detector is responsible for comparing the final score to a rejection threshold. That is, when the score satisfies (e.g., is greater than or equal to) the rejection threshold, the identity document depicted within the document image is determined to be fraudulent. Conversely, when the score does not satisfy (e.g., is less than) the rejection threshold, the identity document depicted within the document image is determined to be authentic. The fraud decision is then passed to the subsystem service interface 202 as discussed above.

In the embodiment, illustrated in FIG. 3, each of MLMs 304, 306, and 310 are freestanding MLMs. That is, each is trained separately by MLM training engine(s) 212, and each is trained using its own subset of training data from train data store 210. In some embodiments, the separate MLMs are desirable because it enables MLM training using disjoint datasets. For example, full sets of information <mrz, document, email, name, idgraph> are not necessarily needed. Instead, training can be performed using an image model that detects fraud on a wider set of documents generatable in various other ways (e.g., can be generated to represent fraud/not fraud and not linked to real identities).

Figure 5:
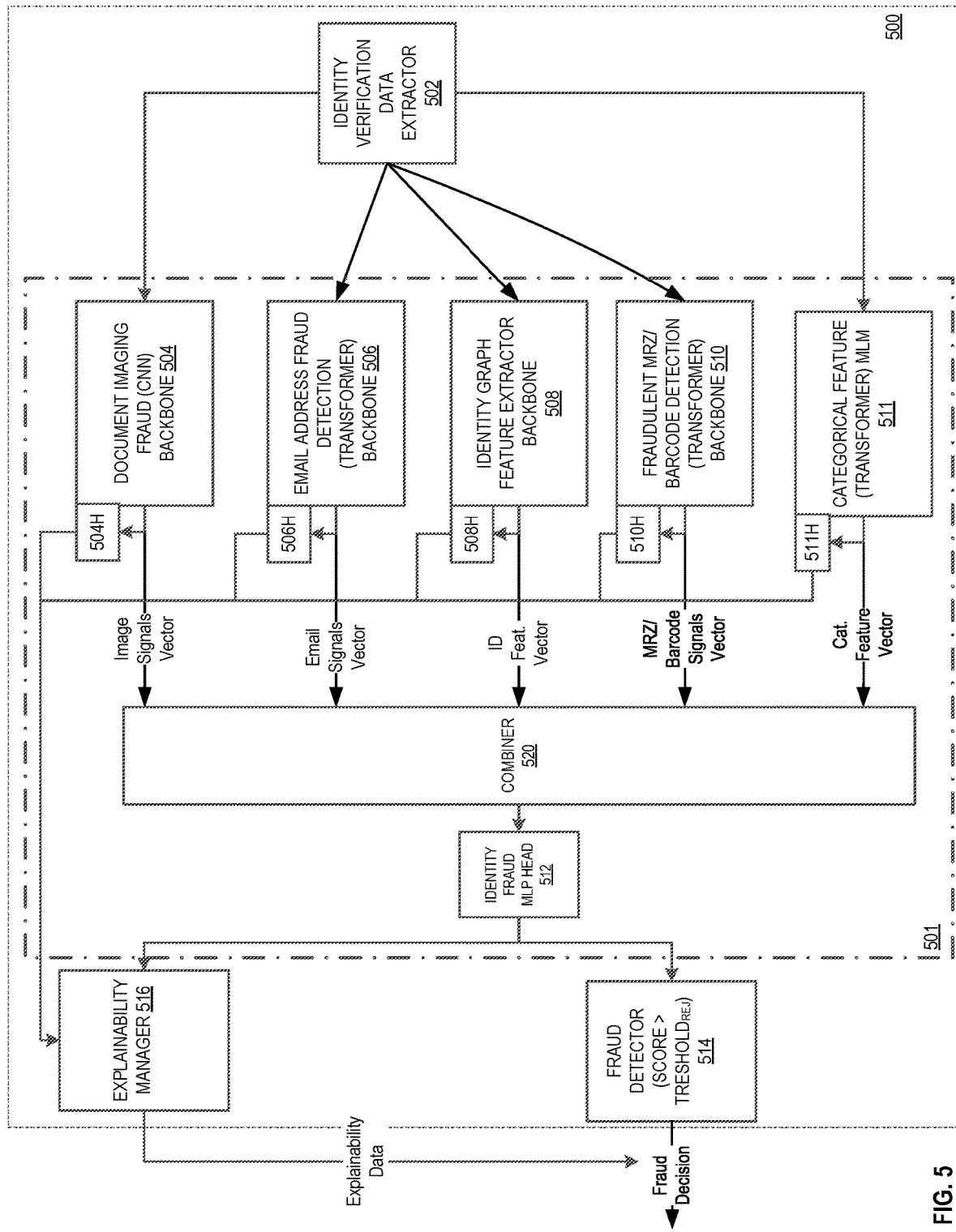
FIG. 5 is a block diagram of one embodiment of a single machine learning model having a plurality of different machine learning model backbones for identity document fraud detection.

However, in another embodiment, as illustrated in FIG. 5, an embodiment 500 of a single machine learning model having a plurality of different machine learning model backbones for identity document fraud detection is illustrated. In the embodiment of FIG. 5, each MLM discussed above in FIG. 3 is present in FIG. 5, as well as an identity verification data extractor 502. However, the single MLM is formed by including each of MLMs 304-311 of FIG. 3 as a backbone feeding an identity fraud multilayer perceptron (MLP) head 512 of the single MLM through combiner 520. In other words, a multiple model MLM 501 is formed with a CNN document imaging fraud backbone 504, a transformer email address fraud detection backbone 506, an identity graph feature extractor backbone 508, a fraudulent MRZ/barcode transformer backbone 510, and a categorical feature MLM 511.

In embodiments, the single MLM 501 is a neural network, and each MLM backbone (e.g., backbones 504-511) of the neural network further includes a respective head 504H-511H. The head of a MLM backbone outputs a set of signals, which can include a fraud determination of the individual backbone as above, as well as one or more additional signals (e.g., signals from a non-final layer of the associated MLM). In embodiments, because the heads 504H, 506H, 508H, 510H, and 511H corresponding to backbones 504, 506, 508, 510, and 511 output multiple signals each to combiner 520. Combiner 520, in embodiments, receives the signal vectors from each MLM backbone and combines them into a single output, fed as an input to the identity fraud MLP head transformer backbone 512. Combiner 520, in embodiments, may combine the different signal vectors by concatenating the vectors to form a single output vector, select a subset of signals from one or more of the input signal vectors forming a reduce signal set as an input to identity fraud MLP head 512, add and/or subtract vectors and/or signal values, perform a transformation on one or more signal values of one or more vectors, perform a weighting operation to emphasize signal values of one or more MLM backbones, as well as other forms of combining the signal vectors output by MLM backbones.

Identity fraud MLP head 512 receives the combined signal vector values (e.g., as a single input signal vector), and generates a final fraud score from the combined signal vectors. Identity fraud MLP head 512, when trained, is able to account for the interplay between signals of the different backbones with more detail when generating the final fraud score. Furthermore, identity fraud MLP head 512 outputs a single fraud detection score to fraud detector 514. Fraud detector 514 makes a similar determination as that discussed above based on a rejection threshold value, and is passed to the subsystem service interface 202 as discussed above.

In embodiments, each head 504H-511H receives corresponding signal vectors simultaneously with those output to combiner 520. Each head 504H-511H then, when trained, generates its own intermediate fraud score for the respective MLM backbone to which it is coupled, where the intermediate fraud scores are indicative of a sub-layer fraud detection by respective MLM backbones 504-511. The intermediate fraud scores are communicated by each head 504H-511H to explainability manager 516. That is, in addition to passing input signals to identity fraud MLP head 512, certain intermediate scores that are indicative of fraud detection by the different MLM backbones are also passed to the explainability manager 516. The explainability manager 516 interprets the intermediate scores to determine how each backbone may have contributed to a final fraud decision of the identity fraud MLP head 512. For example, if a certain backbone had predicted a high intermediate likelihood of fraud, this may be indicated by explainability manager 516 as having a significant impact on the final fraud score (e.g., the image data was determined not to be from a legitimate identity document, the email address does not match the other application data, etc.). This explanation of what contributed and/or what did not contribute to the final fraud decision of identity fraud MLP 512 may be combined with the fraud decision of MLP head 512 when forwarded to the subsystem service interface 202. Therefore, not only is a fraud determination generated, but also one or more indicators of how the fraud decision was reached are generated as an explanation of how the final fraud score may have been reached. This explainability data may help in the feedback solicitation process discussed above in FIG. 2 by indicating what further information may be needed to dispute a fraud determination.

The single MLM having several different backbones benefits from the analysis of different types of identity document image data, as discussed above. Furthermore, and unlike the embodiment of FIG. 3, the single MLM 501 may be trained by training engine 212 using a single annotated set of training data. The single annotated set of training data is therefore a smaller amount of training data than would be used for training multiple independent models. Thus, training is more efficient in that only a single model is periodically retrained, and only a single annotated training data set is needed for periodic retraining purposes. Additionally, the fraud scoring generated by the multiple model MLM 501 leverages more fine-grained signals (e.g., feature vectors of higher dimension) when input to the identity fraud MLP 512 enabling interplay between the signals of the different backbones and/or the same backbone when reaching a final fraud score.

In either embodiment, the fraud detection is improved by using MLM based analysis of different types of potential identity document fraud, which relies on different input data, resulting in a more robust and accurate fraud detection. Furthermore, problems arising from the modern computer paradigm of remote systems communicating with one another can be addressed as the fraud detection does not rely on physical documents, and instead makes accurate fraud determinations from the electronic exchanged image files, as discussed above.

Figure 4:
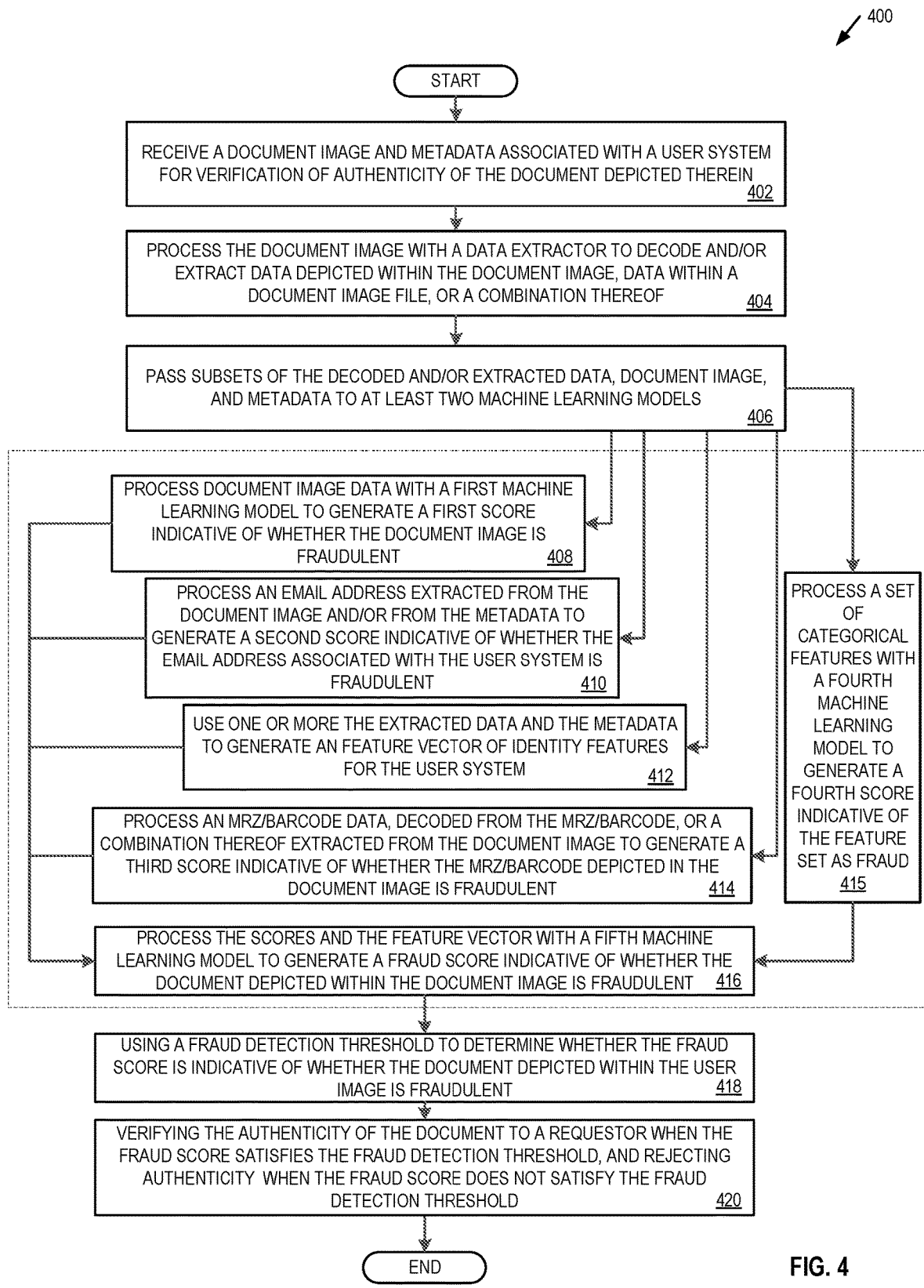
FIG. 4 is a flow diagram of one embodiment of a method for performing identity document fraud detection using an ensemble machine learning models.

FIG. 4 is a flow diagram of one embodiment of a method for performing identity document fraud detection using an ensemble machine learning models. The method 400 is performed by processing logic that may comprise hardware (circuitry, dedicated logic, etc.), software (such as is run on a general purpose computer system or a dedicated machine), firmware, or a combination. In one embodiment, the method 400 is performed by an ensemble of machine learning models (e.g., the ensemble of machine learning models discussed in FIG. 3, as well as in FIGS. 1 and 2).

Referring to FIG. 4, processing logic begins by receiving a document image and metadata associated with a user system for verification of authenticity of the document depicted therein (processing block 402). The document image depicts an identity document provided for verification to access a service of a commerce platform system. Furthermore, the metadata may be supplied from the user during initial data exchange for access to the service (e.g., initial user sign-up information submitted to access the service), during a verification process, or at other times.

Processing logic processes the document image with a data extractor to decode and/or extract data depicted within the document image, data within a document image file, or a combination thereof (processing block 404). The decoding/extracting can include extracting text from the document depicted in the image using OCR based techniques, extracting image data (e.g., pixel data) using an image decoder, extracting metadata from the document image (e.g., location of image capture, camera type, IP address, etc.), exacting data from an MRZ/barcode depicted in the document image by using an MRZ/barcode decoder (e.g., text, identifiers, formatting, etc. encoded in the machine readable code), generating identity features from one or more of the extracted data (e.g., features related to a history of legitimate transactions, a history of operating as a merchant at the commerce platform system, or a combination). The decoding/extracting, in some embodiments, further includes obtaining features from session signaling. For example, as part of initiating a transaction, performing authentication, etc. features including IP address, a geolocation associated with an IP address, a camera type of a camera capturing an image, a browser from which a transaction is requested, an operating system running on a user device, etc. may also be obtained and collected.

Processing logic then passes subsets of the decoded/extracted data, document image, and metadata to at least two machine learning models (processing block 406). The subset of decoded and/or extracted data corresponds to the inputs of the at least two machine learning models, and further include different types of data (e.g., a first subset may include image pixel data, and a second submit may include features associated with user features).

The two or more MLM models may then analyze corresponding input subsets of data, including two or more of processing logic processing document image data with a first machine learning model to generate a first score indicative of whether the document image is fraudulent (processing block 408), processing an email address extracted from the document image and/or from the metadata to generate a second score indicative of whether the email address associated with the user system is fraudulent (processing block 410), using one or more the extracted data and the metadata to generate a feature vector of identity features for the user system (processing block 412), processing an MRZ/barcode data decoded from the MRZ/Barcode, or a combination thereof extracted from the document image to generate a third score indicative of whether the MRZ/Barcode depicted in the document image is fraudulent (processing block 414), and processing a set of categorical features with a fourth machine learning model to generate a fourth score indicative of the feature set as fraud (processing block 415). As discussed herein, each of processing blocks 408-415 are performed by respective MLMs independently of one another. Processing logic then processes the scores and the feature vector with a fifth machine learning model to generate a fraud score indicative of whether the document depicted within the document image is fraudulent (processing block 416). Operations 408-416 are performed by, and correspond with, the MLMs discussed above in the ensemble of machine learning models of FIG. 3.

Using a fraud detection threshold, processing logic determines whether the fraud score is indicative of whether the document depicted within the user image is fraudulent (processing block 418). The fraud detection threshold is a value scaled to the output score value range, and selected to capture fraud detections with a high confidence level. For example, the fourth MLM may output a score between 0 and 1, and the threshold may be set to 0.95 indicating that a high degree of confidence in the output of the fourth MLM is required for finding a document as being fraudulent. Any threshold value and scale may be selected according to the design constraints of the system for which document fraud detection is being performed. Processing logic then verifies the authenticity of the document to a requestor when the fraud score satisfies the fraud detection threshold, and rejects authenticity when the fraud score does not satisfy the fraud detection threshold (processing block 420).

Figure 6:
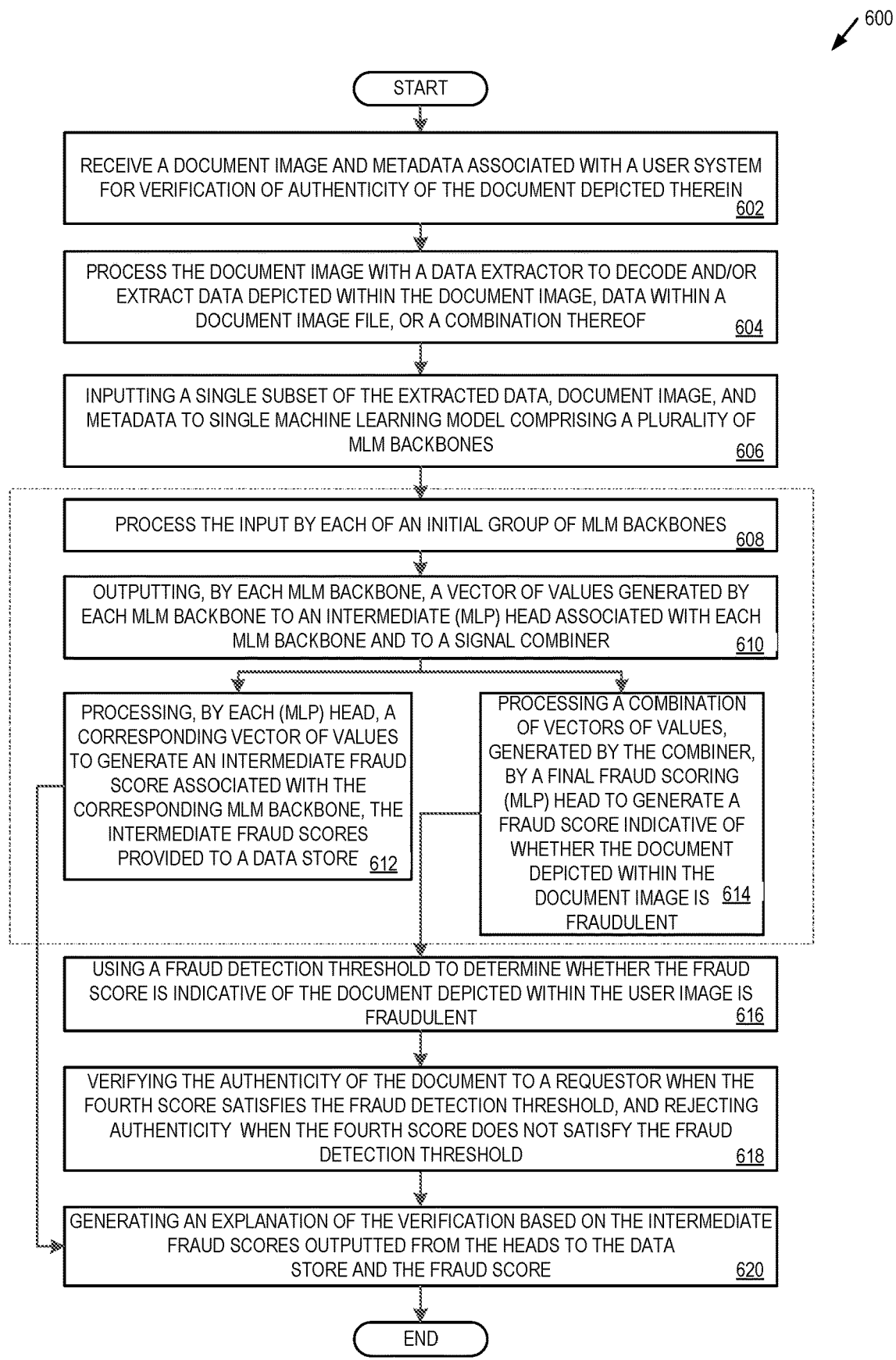
FIG. 6 is a flow diagram of one embodiment of a method for performing identity document fraud detection using a single machine learning model having a plurality of different machine learning model backbones.

FIG. 6 is a flow diagram of one embodiment of a method for performing identity document fraud detection using a single machine learning model having a plurality of different machine learning model backbones. The method 600 is performed by processing logic that may comprise hardware (circuitry, dedicated logic, etc.), software (such as is run on a general purpose computer system or a dedicated machine), firmware, or a combination. In one embodiment, the method 600 is performed by a single machine learning model having a plurality of MLM backbones (as discussed in FIG. 4, as well as in FIGS. 1 and 2).

Referring to FIG. 6, processing logic begins by receiving a document image and metadata associated with a user system for verification of authenticity of the document depicted therein (processing block 602), and processing the document image with a data extractor to decode and/or extract data depicted within the document image, data within a document image file, or a combination thereof (processing block 604).

Processing logic then inputs a single input of the decoded and/or extracted data, document image, and metadata to the single machine learning model comprising a plurality of MLM backbones (processing block 606). In the embodiment of FIG. 6, the single subset corresponds to the subsets discussed above. However, because only a single MLM is used in FIG. 6, the subset combines all data types into a single input.

Processing logic then processes one or more subsets of the single input by each of an initial group of MLM backbones (processing block 608). The subsets are portions of the single input, and correspond with specific inputs that each MLM backbone is configured to receive (e.g., an image MLM is configured to receive pixel data, and an MRZ/barcode MLM is configured to receive decoded machine readable text with optional context data). The initial set of backbones, in embodiments, correspond to backbones 504-511 of FIG. 5.

Processing logic outputs, by each MLM backbone, a vector of values generated from each backbone to] intermediate multilayer perceptron (MLP) heads associated with each backbone and to a signal combiner (processing block 610). The vectors of values corresponds with sets of signals, each set being generated by a respective MLM backbone. Furthermore, the sets of signals are simultaneously passed to MLP heads and a combiner, as discussed herein.

Processing logic processes, by each MLP head, a corresponding vector of values to generate intermediate fraud scores associated with each MLM backbone, the intermediate fraud scores provided to a data store (processing block 612). As discussed above, each MLP head generates an intermediate score indicative of a likelihood of fraud associated with the respective MLM backbone, and which provides indicators of how each backbone's intermediate fraud score may have contributed to a final fraud score. Thus, the intermediate fraud scores generated by the respective MLP heads, are provided to the data store as explainability data. Thus, a final fraud score and/or decision and the intermediate fraud scores may provide indicators of how the final fraud determination was reached (e.g., an identity document is correlated with a user identity for which a significant level of past fraud was detected based on associated identity graph features).

Processing logic further processes a combination of vectors of values, as generated by a combiner, by a final fraud scoring MLP head to generate a final fraud score indicative of whether the document depicted within the document image is fraudulent (processing block 614). As discussed above, the final fraud scoring MLP head receives the combined vector of values (e.g., a concatenation, transformation, etc. of the vectors of values generated by the individual MLM backbones), and uses the combined vector of values as the input processed by the final fraud scoring MLP head.

Processing logic uses a fraud detection threshold to determine whether the final fraud score is indicative of the document depicted within the user image is fraudulent (processing block 616), and processing logic further verifies the authenticity of the document to a requestor when the fourth score satisfies the fraud detection threshold, and rejects authenticity when the fourth score does not satisfy the fraud detection threshold (processing block 618), both of which are performed similar to the discussion above.

Processing logic then generates an explanation of the verification based on the values (e.g., intermediate fraud scores) output from the intermediate heads of the respective MLM backbones to the data store (processing block 620). The explanation can include the fraud determination score, and one or more of the intermediate scores generated above. The intermediate scores can be ranked based on their respective contribution to likelihood of fraud. Furthermore, a subset of the explainability scores may be transmitted to a user with the fraud determination to indicate that data which contributed most significantly to the fraud determination.

Figure 7:
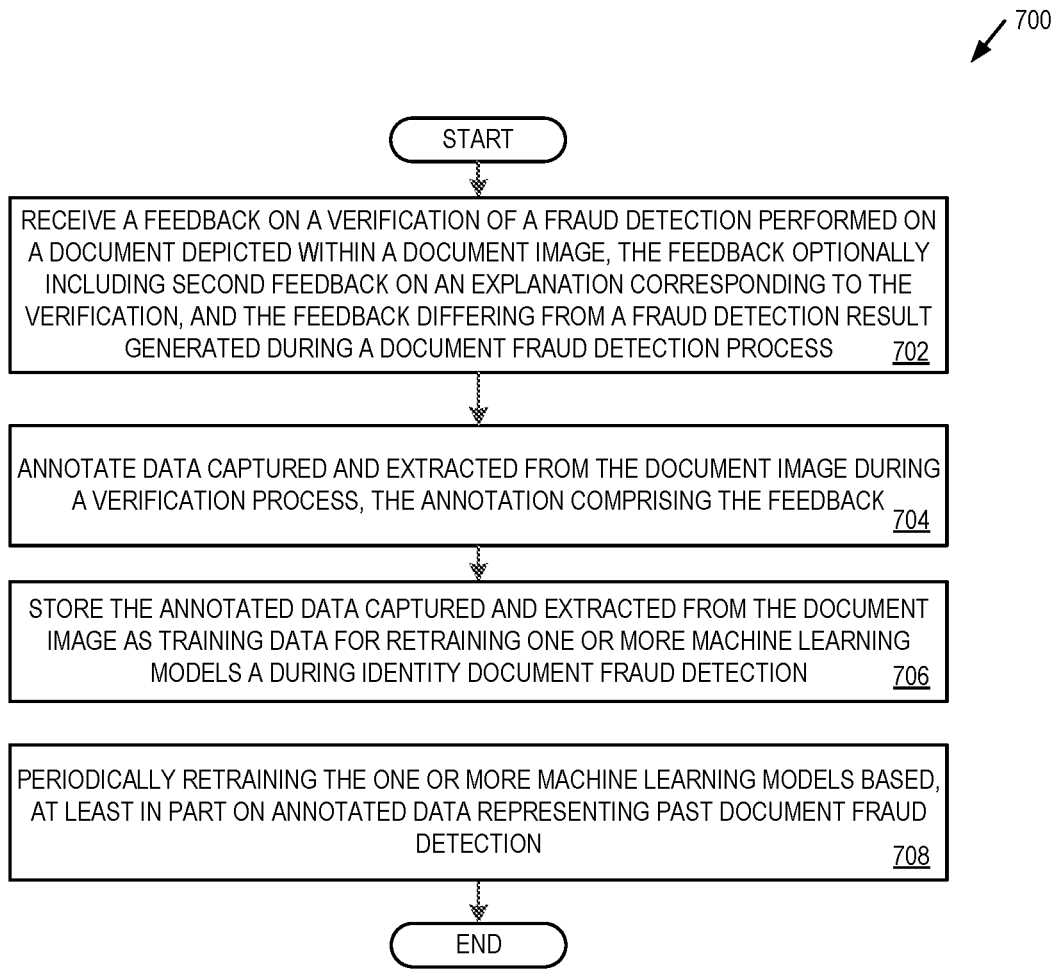
FIG. 7 is a flow diagram of one embodiment of a method for training identity document fraud detection machine learning model(s).

FIG. 7 is a flow diagram of one embodiment of a method for training identity document fraud detection machine learning model(s). The method 700 is performed by processing logic that may comprise hardware (circuitry, dedicated logic, etc.), software (such as is run on a general purpose computer system or a dedicated machine), firmware, or a combination. In one embodiment, the method 700 is performed by an identity document fraud detection system of a commerce platform system (as discussed in FIGS. 1 and 2).

Processing logic begins by receiving a feedback on a verification of a fraud detection performed on a document depicted within a document image, the feedback optionally including second feedback on an explanation corresponding to the verification, and the feedback differing from a fraud detection result generated during a document fraud detection process (processing block 702). That is, in embodiments, a fraud determination may be transmitted to a system seeking to authenticate an identity document at a commerce platform system. The fraud determination may, for example, indicate an identity document was identified as fraudulent and optionally include explainability data. Processing logic, at processing block 702, may therefore receive feedback seeking to contest the fraud determination (e.g., supply a new image, show why information indicated as likely fraudulent was actually valid, etc.).

Processing logic then annotates data captured and extracted from the document image during a verification process, the annotation comprising the feedback (processing block 704). In some embodiments, the feedback is subject to verification prior to annotation of the data captured and extracted from the document image. That is, the validity of the feedback in contesting a fraud determination is examined, and vetted, before the annotation is added to the data. Thus, processing logic storing the annotated data captured and extracted from the document image as training data for retraining one or more machine learning models a during identity document fraud detection (processing block 706) ensures the stored training data is valid (e.g., the contested fraud determination was rightly contested in view of the feedback data.

Processing logic then periodically retrains the one or more machine learning models based, at least in part on annotated data representing past document fraud detection (processing block 708). In embodiments, the feedback and adding of valid contested fraud decisions as training data helps to improve the accuracy and applicability of the MLM based fraud detection discussed herein. More specifically, tricky cases, close calls, edge cases, etc., which may be hard to detect can be supplied via the feedback process, to improve the underlying fraud detection, as well as the machine learning model(s) themselves(s).

Figure 8:
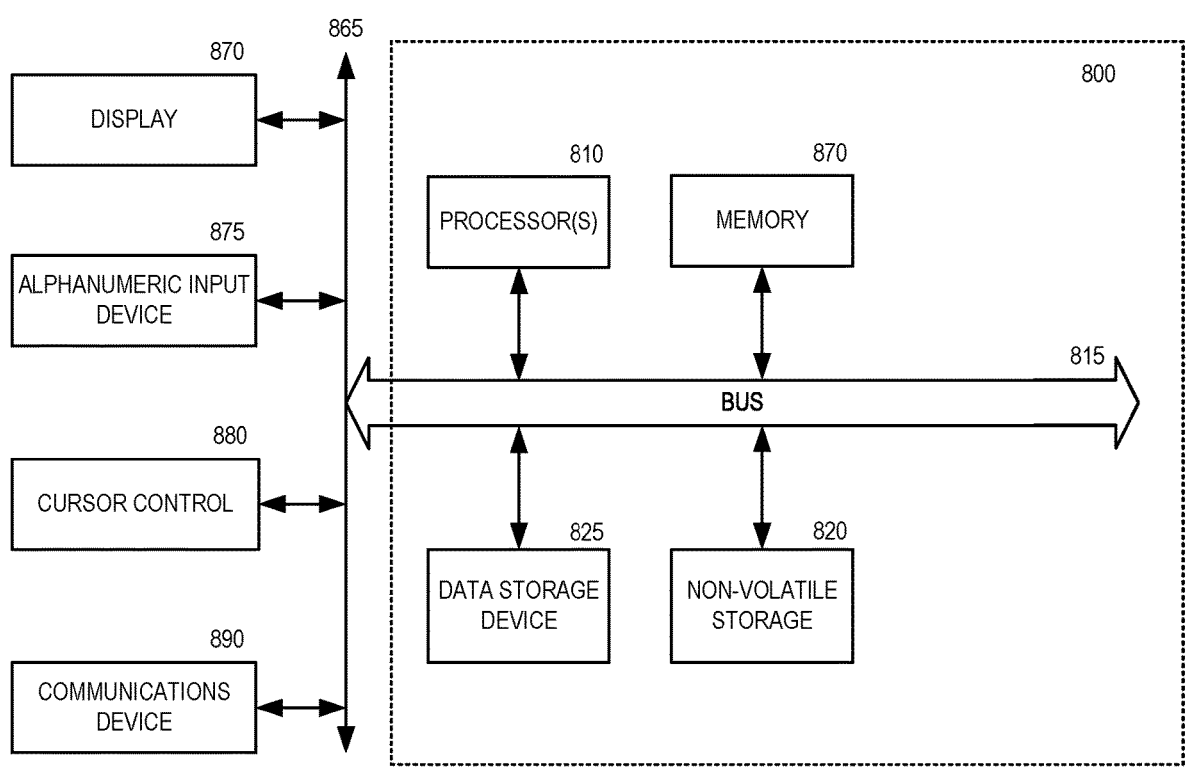
FIG. 8 is one embodiment of a computer system that may be used to support the systems and operations discussed herein.

FIG. 8 is one embodiment of a computer system that may be used to support the systems and operations discussed herein. For example, the computer system illustrated in FIG. 8 may be used by a commerce platform system, a merchant development system, merchant user system, etc. It will be apparent to those of ordinary skill in the art, however that other alternative systems of various system architectures may also be used.

The data processing system illustrated in FIG. 8 includes a bus or other internal communication means 815 for communicating information, and a processor 810 coupled to the bus 815 for processing information. The system further comprises a random access memory (RAM) or other volatile storage device 850 (referred to as memory), coupled to bus 815 for storing information and instructions to be executed by processor 810. Main memory 850 also may be used for storing temporary variables or other intermediate information during execution of instructions by processor 810. The system also comprises a read only memory (ROM) and/or static storage device 820 coupled to bus 815 for storing static information and instructions for processor 810, and a data storage device 825 such as a magnetic disk or optical disk and its corresponding disk drive. Data storage device 825 is coupled to bus 815 for storing information and instructions.

The system may further be coupled to a display device 870, such as a light emitting diode (LED) display or a liquid crystal display (LCD) coupled to bus 815 through bus 865 for displaying information to a computer user. An alphanumeric input device 875, including alphanumeric and other keys, may also be coupled to bus 815 through bus 865 for communicating information and command selections to processor 810. An additional user input device is cursor control device 880, such as a touchpad, mouse, a trackball, stylus, or cursor direction keys coupled to bus 815 through bus 865 for communicating direction information and command selections to processor 810, and for controlling cursor movement on display device 870.

Another device, which may optionally be coupled to computer system 800, is a communication device 890 for accessing other nodes of a distributed system via a network. The communication device 890 may include any of a number of commercially available networking peripheral devices such as those used for coupling to an Ethernet, token ring, Internet, or wide area network. The communication device 890 may further be a null-modem connection, or any other mechanism that provides connectivity between the computer system 800 and the outside world. Note that any or all of the components of this system illustrated in FIG. 8 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 850, mass storage device 825, or other storage medium locally or remotely accessible to processor 810.

It will be apparent to those of ordinary skill in the art that the system, method, and process described herein can be implemented as software stored in main memory 850 or read only memory 820 and executed by processor 810. This control logic or software may also be resident on an article of manufacture comprising a computer readable medium having computer readable program code embodied therein and being readable by the mass storage device 825 and for causing the processor 810 to operate in accordance with the methods and teachings herein.

The embodiments discussed herein may also be embodied in a handheld or portable device containing a subset of the computer hardware components described above. For example, the handheld device may be configured to contain only the bus 815, the processor 810, and memory 850 and/or 825. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 810, a data storage device 825, a bus 815, and memory 850, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

We claim:

1. A method for fraudulent identity document detection using document images that depict identity documents, the method comprising:

receiving, by a service system, a request to activate a service to be performed by a user, the request comprising a document image that is purported to identify the user;

transmitting, by the service system to a server computer system, the document image for detecting whether the identity document depicted within the document image is fraudulent;

extracting, by the server computer system, by one or more data extractors and decoders of the server computer system, data associated with the document image to generate extracted data comprising image data extracted from the document image, image file data extracted from an image file for the document image, or a combination thereof;

processing, by a set of machine learning models of the server computer system, corresponding subsets of the extracted data used as input to each machine learning model of the set of machine learning models, where each machine learning model in the set is trained to generate an initial score indicative of whether a subset of the extracted image data input into said each machine learning model is associated with a fraudulent identity document, wherein the set of machine learning models comprises a convolutional neural network machine learning model trained to determine from pixels of the document image whether the identity document depicted in the document image is fraudulent, wherein the image data extracted from the document image comprises one or more pixel data extracted from the document image;

inputting, by the server computer system, the one or more pixel data in the convolutional neural network machine learning model;

generating, by the convolutional neural network machine learning model, an image score indicative of whether image data of the identity document depicted within the document image is fraudulent; and providing, from the convolutional neural network machine learning model to the second machine learning model, the image score as an input to the second machine learning model, processing, by a second machine learning model head that generates a final score indicative of whether the document image depicts a fraudulent identity document, at least one or more initial scores generated by each of the set of machine learning models to generate the final score, wherein the second machine learning model is trained to generate the final score based, at least in part, on the initial scores including the image score generated by the set of machine learning models used as input to the second machine learning model;

when the final score satisfies a fraudulent document detection threshold, determining, by the server computer system, that the document image depicts a fraudulent identity document;

transmitting, by the server computer system to the service system, a positive fraud determination indicative of the fraudulent identity document determination when the final score satisfies a fraudulent document detection threshold; and denying, by the service system, the request from the client to activate the service for the user, in response to receiving the positive fraud detection.

2. The method of claim 1, wherein the set of machine learning models comprises a plurality of different machine learning models that each determine an independent initial score indicative of different types of fraud determination of the identity document depicted within the document image.

3. The method of claim 2, wherein receipt of the document image further comprises:

receiving user metadata associated with a user for purported to be identified by the identity document, the user metadata comprising at least one of an email address, a phone number, an IP address of a user computer system from which the document image was obtained from the user, a geolocation associated with IP address, a service provider associated with the IP address, camera metadata of a camera used to capture the document image; and extracting, from the extracted data, decoded user data comprising at least one of a first name of the user depicted within the identity document, a last name of the user depicted within the identity document, an address of the user depicted within the identity document, a date of birth of the user depicted within the identity document, barcode data depicted within the identity document, and machine readable zone data depicted within the identity document.

4. The method of claim 3, wherein the set of machine learning models comprises a first transformer machine learning model trained to analyze an email address obtained from one or more of the user metadata and decoded user data in a context with additional user metadata and decoded user data to determine whether the email address is fraudulent.

5. The method of claim 4, further comprising:

inputting, by the server computer system, the email address and the additional user metadata and decoded user data into the first transformer machine learning model;

generating, by the first transformer machine learning model, an email score indicative of whether the email address extracted from the document image is fraudulent; and providing, from the first transformer machine learning model to the second machine learning model, the email score as an input to the second machine learning model, wherein the second machine learning model is trained to generate the final score based at least in part on the email score.

6. The method of claim 3, wherein the set of machine learning models comprises a second transformer machine learning model trained to analyze barcode data, machine readable zone data, or a combination thereof obtained from the decoded user data based on an order of individual data within the barcode data, machine readable zone data, or the combination thereof.

7. The method of claim 6, further comprising:

inputting, by the server computer system, the barcode data, machine readable zone data, or a combination thereof into the second transformer machine learning model;

generating, by the second transformer machine learning model, an MRZ/barcode score indicative of whether the barcode data, machine readable zone data, or the combination thereof extracted from the document image is fraudulent; and providing, from the second transformer machine learning model to the second machine learning model, the MRZ/barcode score as an input to the second machine learning model, wherein the second machine learning model is trained to generate the final score based at least in part on the MRZ/barcode score.

8. The method of claim 3, further comprising:

generating, using an identity graph database of the server computer system, one or more identity data features, where each identity data feature provides an association with an identity in the identity graph database; and providing, to the second machine learning model, the one or more identity data features as an input to the second machine learning model, wherein the second machine learning model is trained to generate the final score based at least in part on the identity data values.

9. The method of claim 2, wherein the set of machine learning models comprises a categorical feature MLM trained to generate a score indicative of whether a set of categorical features are associated with fraud, wherein the categorical features comprises two or more of an internet protocol (IP) address, a geographic location associated with the IP address, a cameral label, an device type, a device operating system, a browser, or a combination thereof.

10. The method of claim 1, wherein the one or more decoders comprise an optical character recognition decoder, a barcode decoder, a machine readable zone decoder, or a combination thereof.

11. The method of claim 1, wherein the server computer system is comprised in a commerce platform system.

12. The method of claim 11, further comprising:

transmitting a negative fraud determination, by the server computer system to the service system, indicative of a non-fraudulent identity document determination when the final score does not satisfy the fraudulent document detection threshold.

13. The method of claim 1, wherein the second machine learning model is a tree based machine learning model, and the set of machine learning models comprise one or more of neural network machine learning models and transformer machine learning models, and wherein the method further comprises:
  receiving, by the server computer system, feedback data on the determination as to whether the document image depicts the fraudulent identity document, wherein the feedback data differs from a determined fraudulent nature of the identity document depicted within the document image;
  annotating the document image with the feedback data;
  storing the annotated document image in training data store with a collection of machine learning model training data; and
  periodically retraining each of the set of machine learning models and the second machine learning model using corresponding samplings of the collection of machine learning model training data from the training data store.

14. The method of claim 1, wherein the document image is received from the service system of the commerce platform system.

15. The method of claim 14, wherein the service system provides the document image to the server computer system with a request to verify the identity document depicted thereon as a condition of the service system providing the service to a user purported to be identified by the identity document.

16. A non-transitory computer readable storage medium storing instructions, which when executed by a computer processing system, causes the computer processing system to perform operations for fraudulent identity document detection using document images that depict identity documents, the operations comprising:
  receiving, by a service system, a request to activate a service to be performed by a user, the request comprising a document image that is purported to identify the user;
  transmitting, by the service system to a server computer system, the document image for detecting whether the identity document depicted within the document image is fraudulent;
  extracting, by one or more data extractors and decoders of the server computer system, data associated with the document image to generate extracted data comprising image data extracted from the document image, image file data extracted from an image file for the document image, or a combination thereof;
  processing, by a set of machine learning models of the server computer system, corresponding subsets of the extracted data used as input to each machine learning model of the set of machine learning models, where each machine learning model in the set is trained to generate an initial score indicative of whether a subset of the extracted image data input into said each machine learning model is associated with a fraudulent identity document, wherein the set of machine learning models comprises a convolutional neural network machine learning model trained to determine from pixels of the document image whether the identity document depicted in the document image is fraudulent, wherein the image data extracted from the document image comprises one or more pixel data extracted from the document image;
  inputting, by the server computer system, the one or more pixel data in the convolutional neural network machine learning model;
  generating, by the convolutional neural network machine learning model, an image score indicative of whether image data of the identity document depicted within the document image is fraudulent;
  providing, from the convolutional neural network machine learning model to the second machine learning model, the image score as an input to the second machine learning model;
  processing, by a second machine learning model that generates a final score indicative of whether the document image depicts a fraudulent identity document, at least one or more initial scores generated by each of the set of machine learning models to generate the final score, wherein the second machine learning model is trained to generate the final score based, at least in part, on the initial scores including the image score, generated by the set of machine learning models used as input to the second machine learning model;
  when the final score satisfies a fraudulent document detection threshold, determining, by the server computer system, that the document image depicts a fraudulent identity document;
  transmitting, by the server computer system to the service system, a positive fraud determination indicative of the fraudulent identity document determination when the final score satisfies a fraudulent document detection threshold; and
  denying, by the service system, the request from the client to activate the service for the user, in response to receiving the positive fraud detection.

17. The non-transitory computer readable storage medium of claim 16, wherein the set of machine learning models comprises a plurality of different machine learning models that each determine an independent initial score indicative of different types of fraud determination of the identity document depicted within the document image.

18. The non-transitory computer readable storage medium of claim 16, wherein the second machine learning model is a tree based machine learning model, and the set of machine learning models comprise one or more of neural network machine learning models and transformer machine learning models, and wherein the method further comprises:
  receiving, by the server computer system, feedback data on the determination as to whether the document image depicts the fraudulent identity document, wherein the feedback data differs from a determined fraudulent nature of the identity document depicted within the document image;
  annotating the document image with the feedback data;
  storing the annotated document image in training data store with a collection of machine learning model training data; and
  periodically retraining each of the set of machine learning models and the second machine learning model using corresponding samplings of the collection of machine learning model training data from the training data store.

19. A system for fraudulent identity document detection using document images that depict identity documents, the system comprising:
  a memory; and
  one or more processors coupled with the memory configured to perform operations, comprising:

receiving, by a service system, a request to activate a service to be performed by a user, the request comprising a document image that is purported to identify the user;

transmitting, by the service system to a server computer system, a document image for detecting whether an identity document depicted within the document image is fraudulent;

extracting, by the server computer system, by one or more data extractors and decoders, data associated with the document image to generate extracted data comprising image data extracted from the document image, image file data extracted from an image file for the document image, or a combination thereof;

processing, by a set of machine learning models, corresponding subsets of the extracted data used as input to each machine learning model of the set of machine learning models, where each machine learning model in the set is trained to generate an initial score indicative of whether a subset of the extracted image data input into said each machine learning model is associated with a fraudulent identity document, wherein the set of machine learning models comprises a convolutional neural network machine learning model trained to determine from pixels of the document image whether the identity document depicted in the document image is fraudulent, wherein the image data extracted from the document image comprises one or more pixel data extracted from the document image;

inputting, by the server computer system, the one or more pixel data in the convolutional neural network machine learning model;

generating, by the convolutional neural network machine learning model, an image score indicative of whether image data of the identity document depicted within the document image is fraudulent; and providing, from the convolutional neural network machine learning model to the second machine learning model, the image score as an input to the second machine learning model;

processing, by a second machine learning model that generates a final score indicative of whether the document image depicts a fraudulent identity document, at least one or more initial scores generated by each of the set of machine learning models to generate the final score, wherein the second machine learning model is trained to generate the final score based, at least in part, on the initial scores including the image score generated by the set of machine learning models used as input to the second machine learning model;

when the final score satisfies a fraudulent document detection threshold, determining that the document image depicts a fraudulent identity document;

transmitting, by the server computer system to the service system, a positive fraud determination indicative of the fraudulent identity document determination when the final score satisfies a fraudulent document detection threshold; and denying, by the service system, the request from the client to activate the service for the user, in response to receiving the positive fraud detection.

\* \* \* \* \*